3,830,907
COMPOSITIONS FOR THE SUSTAINED RELEASE OF 17α-ETHYL-19-NORTESTOSTERONE

George E. Short, Arlington Heights, Ill., assignor to G. D. Searle & Co., Chicago, Ill.
No Drawing. Continuation-in-part of application Ser. No. 723,284, Apr. 22, 1968, now Patent No. 3,565,991, dated Feb. 23, 1971. This application Apr. 15, 1970, Ser. No. 28,934

Int. Cl. A61k 17/00

U.S. Cl. 424—19        9 Claims

ABSTRACT OF THE DISCLOSURE

Compositions for the sustained release of 17α-ethyl-19-nortestosterone comprising the steroid dispersed in a copolymer of a monoester of an olefinic acid and a diester of an olefinic acid. A method of controlling ovulation and estrus in bovines by the parenteral administration of 17α-ethyl-19-nortestosterone. Compositions containing 17α-ethyl-19-nortestosterone for parenteral administration.

---

The application for Letters Patent securing the invention herein described and claimed is a continuation-in-part of applicant's prior copending application Ser. No. 723,284, filed Apr. 22, 1968, now U.S. Pat. No. 3,565,991, dated Feb. 23, 1971.

SUMMARY OF THE INVENTION

This invention relates to compositions useful in treating female bovines with 17α-ethyl-19-nortestosterone to control ovulation and estrus and to methods of accomplishing said treatment. Such controlled ovulation and estrus is particularly useful in the course of breeding such farm animals for commercial purposes.

One embodiment of this invention is a novel composition comprising 17α-ethyl-19-nortestosterone dispersed in a copolymer of a major amount of a monoester of an acrylic or methacrylic acid and a minor amount of a diester of one of said acids each monomer component being chosen such that the resultant copolymer contains at least one free hydroxy group. These polymers *per se* and their manner of manufacture are generally described in U.S. Pats. Nos. 2,976,576 and 3,220,960, except that in the most preferred embodiment of this invention an aqueous solution is not used in the polymerization so that an anhydrous polymer is prepared instead of the hydrogels of U.S. Pats. 2,976,576 and 3,220,960. A further significant distinction lies in the fact that the steroid is added to the monomer mixture prior to polymerization.

The 17α-ethyl-19-nortestosterone is prepared in accordance with methods disclosed in the literature, suitably by the methods described in U.S. Pat. No. 2,721,871.

Progestational steroids have been administered to domestic animals orally and parenterally for various purposes, including the control of ovulation and estrus. One purpose of such control is to attain near simultaneous release of ovulation and estrus in large numbers of cycling animals following cessation of treatment (*i.e.*, synchronization of estrus and ovulation), thus facilitating controlled breeding for commercial purposes, *e.g.*, breeding by an artificial insemination, natural service or hand service. Another important commercial purpose of such control is to induce ovulation in acyclic animals, such as animals which have recently borne young and animals having impaired fertility resulting from neurohormonal imbalances or deficiencies resulting in failure to cycle.

The desirable compound for controlling ovulation and estrus is one effective at low dosage, which is able to release ovulation and estrus nearly simultaneously within a short, predeterminable period after discontinuance of its use, and which does not interfere with subsequent fertility, particularly on the first post-treatment cycle.

Previously, a number of progestational steroids have been used to control estrus and ovulation in selected animal species. These compounds were often used by the oral route of administration, suitably by mixing the compound with the feed. Problems which have been encountered with such compounds and with such oral administration involve either a too long acting effect, undesired variability in the time of release of ovulation and estrus, or impaired fertility at the first post-treatment cycle. Additionally, the practice of mixing the compound with the feed resulted in variations attributed to differences in the food intake from animal to animal and also made synchronization by this means unsuitable for range cattle, which have not been or can only, with difficulty, be adapted to ground feed.

In accordance with this invention, it has been found that 17α-ethyl-19-nortestosterone, generically termed norethandrolone, a steroid having a combination of progestational, anabolic and anti-esterogenic properties, can be used parenterally to control ovulation and estrus in bovines at doses as low as about 5 mg. per day and permits the near simultaneous release of estrus and ovulation within an optionally short, pre-determinable period after discontinuance of its use. In addition, the compound has been used to control estrus and ovulation without impairment of—and in some cases—with increased fertility, particularly on the first post-treatment cycle. This discovery is particularly surprising in view of the fact that 17α-ethyl-19-nortestosterone has been found ineffective orally to prevent estrus and ovulation in cows when administered at doses up to 96 mg. per day. This discovery is also surprising in view of the lowered fertility on the first post-treatment cycle, long periods of anestrus or frequently recurring estrus often found when the structurally related 17α-ethynyl-17β-hydroxy-estr-5(10)-en-3-one, or a mixture thereof with about 1.5% of ethynylestradiol 3-methylether, or when 17-(2-methylallyl)-19-nortestosterone have been used.

In accordance with this invention the norethandrolone is made up for parenteral administration by incorporation into a pharmaceutically acceptable carrier. Suitable pharmaceutically acceptable carriers for injection to induce ovulation in acyclic animals include water, edible oils, alcohols, glycols and oil and water-base pastes of polyglycols; synchronization is conveniently achieved by injection of norethandrolone in edible oils. Such carriers may additionally include isotonic and suspending agents, surfactants, preservatives, bactericidal and bacteriostatic agents. Suitable pharmaceutically acceptable carriers for implantation include non-toxic diluents and bulking agents, and solid porous materials such as silicone rubber and polyurethane, in which the steroid is dispersed.

In accordance with this invention it has been found that particularly useful compositions for administering norethandrolone are copolymers of a major amount of a monoester of an acrylic or methacrylic acid and a minor amount of a diester of one of these acids each monomer component being chosen such that the resultant copolymer contains at least one free hydroxy group in which norethandrolone has been dispersed. These copolymers are generally described in U.S. Pats. Nos. 2,976,576 and 3,220,960 but are most preferably prepared without the use of water in the polymerization mixture and with the addition of the steroid to the polymerization mixture. The subcutaneous implantation of such a composition containing 17α-ethyl-19-nortestosterone has been found conveniently to permit the controlled release of that steroid throughout a given treatment period. Such release is dependent upon the rate of diffusion of that steroid into the animal which is directly related to the solubility of the chosen medicament in the bovine tissue fluids. It has been found that this implantation technique is analogous to constant infusion and permits a desirable lowering of the effective dose required to accomplish synchronization as well as reduces the number of times an animal need be handled. The monoester monomers for use in preparing the aforementioned copolymers typically include methacrylyl glycolic acid and the monomethacrylates and monoacrylates of glycols, glycerol, di- and poly-alkylene glycols, and other polyhydroxylic compounds. The diester monomers for use in preparing the copolymer and serving as the cross-linking agents thereof include the diacrylates and dimethacrylates of glycols, glycerol, di- and poly-alkylene glycols, and other poly-hydroxylic compounds, including ethylene glycol and triethylene glycol. An especially preferred and advantageous composition embodied by this invention is that copolymer composition prepared by combining a major amount of 2-hydroxyethyl methacrylate with a minor amount of ethylene glycol dimethacrylate and a suitable amount of norethandrolone. This mixture, preferably together with a known polymerization initiator (such as diisopropyl peroxydicarbonate), is bulk polymerized suitably by warming to yield the implant.

The dosage of norethandrolone to be administered to the bovine depends on the weight and condition of the animal to be treated, the route of administration, the dosage form employed and the nature of the desired results. Where it is desired to control estrus and ovulation in a cycling animal or an acyclic animal that has recently borne young, the desirable dosage to permit the release of ovulation and estrus within a few days after termination of treatment is about 5 milligrams per day, desirably given over about a 14 to 16-day treatment period. Where the compound is to be used to control ovulation and estrus by the induction thereof in animals having impaired fertility due to neurohormonal imbalances, the norethandrolone is desirably administered in one or more single doses of at least 25 to 50 milligrams, or can be used as with the cycling animals.

Where the norethandrolone is to be administered over a period of two or more days by means of one or more implant compositions, each implant composition should contain 1.5 to 3 fold, or greater multiples of the total dosage to be administered to insure that an adequate amount of compound enters the system of the cow over the entire treatment period. Thus the copolymer implant compositions previously mentioned for use over about a 14 to 16-day treatment period desirably each contain at least about 100 milligrams and preferably about 300 mg., or norethandrolone. A convenient size of implant used has been found to be cylindrically shaped, for example in the form of a rod or tube, having a diameter of 0.3 to 1.0 centimeter and a length from 1 to 20 centimeters. Particularly preferred dimensions are a diameter of 0.5 centimeter and a length of 2.5 to 10 centimeters. It has been found this size and shape combines maximum surface area with a size sufficient to permit ease of instrumentation in implanting without presenting disruptive psychological problems.

Subcutaneous implantation of a composition containing 17α-ethyl-19-nortestosterone has been found to conveniently permit the controlled release of that steroid throughout a given treatment period. Such controlled release is dependent upon the rate of diffusion of the steroid into the animal and is also directly related to the solubility of the chosen compound in the bovine tissue fluids. It has been found that this implantation technique permits a desirable lowering of the effective dose required to accomplish synchronization as well as reduces the number of times an animal need be handled. Desirably, the implant composition should contain sufficient norethandrolone to permit the release of about 5 mg. per day. To achieve this effect it has been determined that the norethandrolone implant composition should contain 1.5 to 3 fold multiples of the total dosage to be administered to insure that an adequate amount of compound enters the system of the cow over the entire treatment period. Thus the copolymer implant compositions for use over about a 14 to 16 day treatment period desirably each contain at least about 100 mg. and preferably about 300 mg. of norethandrolone. As stated previously, a convenient shape and size of the device has been found to be a cylindrical shape, for example in the form of a solid rod or hollow tube having a diameter of 0.3 to 1.0 centimeter and a length from 1 to 20 centimeters. Particularly preferred dimensions are a diameter of 0.5 centimeter and a length of 2.5 to 10 centimeters.

The cylindrical shape has been advantageously selected for subcutaneous use in bovines because the shape affords both maximum surface area, into which the chosen concentration of steroid can be dispersed, and ease of instrumentation in implantation. Since it has been established that there is a linear relationship between rate of elution and surface area of the implant device available for contact with tissue fluids, as well as rate of elution and concentration of the steroid to be released, it was desired to select a device which would permit the maximum coordination of these factors. Additionally, the relatively small size is preferable from the standpoint of facilitating implantation under the skin (e.g., minor incisions are required) and avoiding disruptive psychological problems on the part of the implantor.

Moreover, it has been found that a hollow, cylindrical tube shaped implant is a particularly preferred cylindrical type since greater surface area contact is provided than by the solid cylindrical rod shaped implant.

Another advantage of this invention is that the composition is provided with means for maintaining the medicament in direct contact with the body tissues after subcutaneous administration and in such a manner that the device can be withdrawn easily at any desired time. Specifically, in order to remove the implant compositions at will, they are provided with cord-like means affixed to the composition by incorporating the composition in a mesh-like enclosure having cord-like withdrawal means at one or each end of the enclosure. A mesh-like enclosure, as opposed to a solid enclosure not having an open texture, is desirable for the implant composition since such an enclosure permits the surface of the implant composition to contact the tissue fluids, thus enabling elution. Upon implantation, these cord-like withdrawal means protrude from the skin openings. To secure the composition in place, they may be tied in knots; to accomplish easy removal tension is applied to the protruding withdrawal means after dividing it lateral to the tie. Because of ready availability and relative inexpensiveness, silverplated copper mesh has been chosen as a sufficient and desirable material from which to make the mesh-like enclosure; other materials suitable for forming meshlike enclosures can be employed such as woven cloth, plastics such as polyvinyl or polyethylene, or the like. Silverplated copper mesh has been found sufficient in that it can be twisted and formed to enclose the implant composition and provide the withdrawal means. Also, it minimizes the number of crypts in which microorganisms can take refuge from body defenses, it has great tensile strength and it evokes little or no tissue reaction.

It has been advantageously found that the above described implant composition also can be used in the following manner. At the time of implantation a single injection of 5 milligrams of estradiol valerate or an equivalent biological amount of another long-acting estrogen which serves to promote regression of the corpora lutea, is simultaneously administered. The implant is then retained in the animal for a period of nine or ten days. Twenty-four hours subsequent to removal of the implant a 0.5 mg. to 2 mg. injection of 17β-estradiol is administered intramuscularly. This regimen provides not only improved synchronization of estrus and ovulation, but also an increased rate of conception on first service following a shortened treatment period.

The following examples are given by way of illustrating the invention and are not to be construed as limiting. Unless otherwise indicated, amounts of material given in parts are parts by weight.

EXAMPLE 1

127 grams of crystalline norethandrolone is micronized to a product having a particle size of about 1 to 5 microns. The preparation is then mixed with 1125 parts of crystalline sorbitol, 25 milliliters of sorbitan monooleate polyoxyethylene and sufficient water for injection is added to the mixture to bring the volume up to 2500 milliliters. The resulting mixture is stirred for about 5 hours to afford a composition containing 50 milligrams norethandrolone per millliliter, which is filled into vials.

EXAMPLE 2

An aqueous diluent is prepared consisting of 5 mg. sodium carboxymethylcellulose, 5.5 mg. sorbitan monooleate polyoxyethylene, 1.8 mg. methyl p-hydroxybenzoate and 0.2 mg. propyl p-hydroxybenozate per milliliter in water for injection. To 100 grams of norethandrolone which has been micronized to a particle size of less than 5 microns, there is added sufficient aqueous diluent to bring the volume up to 1 liter. The resulting mixture is stirred for 1 hour to afford a suspension containing 100 mg. norethandrolone per milliliter.

EXAMPLE 3

To a solution of 7.5 grams of norethandrolone in 100 ml. of acetone, there is added 400 ml. of an aqueous suspension containing 2% by weight of lecithin. The mixture is stirred rapidly for about 3½ hours at 70° C., then filtered. The material remaining on the filter is washed with water then air-dried for about 48 hours to afford the lecithin coated steroild. To 5.3 grams of the latter composition there is added sufficient sterile distilled water containing 0.5% by weight lecithin and 0.3% by weight sodium carboxymethylcellulose to bring the volume up to 170 milliliters. To 20 ml. of the resulting suspension is added sufficient sterile distilled water containing 0.3% by weight carboxymethylcellulose and 0.5% by weight of lecithin to bring the volume up to 60 ml. The resulting suspension is poured into vials.

EXAMPLE 4

To 20.9 grams of norethandrolone there is added 500 ml. of ethanol and the mixture is stirred until solution is complete, thus affording a composition containing 16 grams of norethandrolone per 400 ml.

EXAMPLE 5

To 6.3 grams of norethandrolone there is added sufficient corn oil to bring the volume up to 2.4 liters. The resulting mixture is heated to about 50° C. and maintained there with stirring until solution is completed. The resulting mixture is filtered through a medium porosity sintered glass filter, then poured into vials to afford a composition containing 2.5 mg. norethandrolone per ml.

EXAMPLE 6

10.5 grams of norethandrolone is triturated with 20 ml. of benzylalcohol then sufficient sesame oil is added to the mixture to bring the volume up to 1 liter. The resulting solution is then filtered to remove bacteria, to afford a composition containing 10 mg. norethandrolone per milliliter, then poured into vials. Alternatively, corn oil can be substituted for the sesame oil.

EXAMPLE 7

To 9 grams of norethandrolone there is added sufficient propylene glycol to bring the volume up to 360 ml. The mixture is then stirred with warming until solution is completed. The resulting solution is then filtered through the sintered glass filter to afford a composition containing 25 mg. norethandrolone per milliliter.

EXAMPLE 8

A mixture of 3461 parts of 2-hydroxyethyl methacrylate, 34 parts of ethylene glycol dimethacrylate and 5 parts of diisopropyl peroxydicarbonate, and 1500 parts of norethandrolone is warmed to 45° C. to effect solution. To a series of tubular polypropylene molds having an internal diameter of 5 millimeters there is added 130 parts each of the solution. The molds are then supported vertically in a hot water bath at 85° C. for ten minutes to effect polymerization. After removal from the case, the resulting rods each are polished to a weight of 125 parts. The rods are then encased in a nylon mesh sleeve which is tied at each end of the rods.

EXAMPLE 9

A mixture of 3461 parts of 2-hydroxyethyl methacrylate, 34 parts of ethylene glycol dimethacrylate and 5 parts of diisopropyl peroxydicarbonate, and 1500 parts of norethandrolone is warmed to 45° C. to effect solution. To a series of tubular polypropylene molds having an internal diameter of 5 millimeters there is added 130 parts each of the solution. The molds are then supported vertically in a hot water bath at 85° C. for ten minutes to effect polymerization. After removal from the case, the resulting rods each are polished to a weight of 125 parts. The rods are then encased in a polyethylene mesh sleeve which is tied at each end of the rods.

EXAMPLE 10

A mixture of 4200 parts of 2-hydroxyethyl methacrylate, 43 parts of ethylene glycol dimethacrylate, 7 parts of diisopropyl peroxydicarbonate and 750 parts of norethandrolone is stirred at room temperature to effect solution. To each of a series of tubular polypropylene molds, having an internal diameter of 5 millimeters there is added 250 parts each of the solution and a braided nylon cord having a diameter of 3.5 millimeters was inserted into the liquid contained within the mold to a depth of 1.5 centimeters from the bottom. The molds are then placed in a water bath held at 75° C. for 25 minutes to effect polymerization. The resulting rods having the cord embedded therein are removed from the mold and ground on the end to provide a point and to reduce the weight of the polymerized material to 200 parts.

EXAMPLE 11

A mixture of 3461 parts of 2-hydroxy ethyl methacrylate, 34 parts of ethylene glycol dimethacrylate, 5 parts of diisopropyl peroxydicarbonate and 1500 parts of norethandrolone is warmed to about 45° C. to effect solution. To each of a series of tubular polypropylene molds having an internal diameter of 5 millimeters and having placed therein a centered polytetrafluoroethylene mandrel having a 2 millimeter diameter, there is added 130 parts of the mixture. The molds are then placed in a water bath maintained at 75° C. for 20 minutes to effect polymerization. The cast tubes are then separated from the outer mold and the mandrel, then polished to a weight of 125 parts each. The tubes are then encased in polyethylene mesh sleeves, having 8 filaments per inch, to provide removal implants.

EXAMPLE 12

A mixture of 3461 parts of 2-hydroxyethyl methacrylate, 34 parts of ethylene glycol dimethacrylate, 5 parts of diisopropyl peroxydicarbonate and 1500 parts of norethandrolone is warmed to about 45° C. to effect solution. To each of a series of tubular polypropylene molds having an internal diameter of 5 millimeters and having placed therein a centered polytetrafluoroethylene mandrel having a 2 millimeter diameter, there is added 130 parts of the mixture. The molds are then placed in a water bath maintained at 75° C. for 20 minutes to effect polymerization. The cast tubes are then separated from the outer mold and the mandrel, then polished to a weight of 125 parts each. The tubes are then encased in silverplated copper mesh sleeves to provide removal implants.

EXAMPLE 13

Twenty-five cycling heifers were divided into groups of 5 heifers each. As each heifer in a particular group was detected in estrus, it was given a single injection of an aqueous suspension containing 400 mg. of the particular test compound the following day and was thereafter observed for estrus at least three times daily until observed in estrus or for at least 100 days. In the group receiving norethandrolone as the test compound, the animals returned to estrus 26, 26, 26 and 28, 36 days (an average of 28.4 days) after injection. In the group receiving 17α-methallyl-19-nortestosterone as test compound, the animals returned to estrus 31, 39, 43, 53 and 76 days (an average of 48.4 days) after injection. In the group receiving 17α-chloroethynyl-19-nortestosterone as test compound, the animals returned to estrus 36, 43, 53, 53, and 58 days (an average of 40.6 days) after injection. The five receiving 6 - dehydro - 6-methyl-17α-acetoxyprogresterone as test compound returned to estrus 50, 57, 79, 80 and 85 days (an average of 70.2 days) after injection. Of the five receiving 6α-methyl-21-fluoro-17α-acetoxyprogesterone, one returned to estrus 258 days later, and none of the other four before 365 days after injection.

EXAMPLE 14

Six dairy cows, which were in the fifth, twelfth, fourth, thirteenth, seventh and twelfth days of the cycle, respectively, were injected for 19 consecutive days with 4.8 mg. of norethandrolone in corn oil, except for the first cow which was injected for 20 days. None of the cows showed estrus during the treatment and all came into estrus on the second post-treatment day. At the first post-treatment estrus, all cows were artificially inseminated and all but one conceived. That one conceived on the second post-treatment cycle.

EXAMPLE 15

Ten cows were subcutaneously implanted, in the back, using a copolymer device of the type described in the previous examples measuring about 10 centimeters in length by 0.5 centimeter in diameter and containing from 100 to 300 mg. of norethandrolone. All the implants were provided with a braided nylon withdrawal cord. Cords were secured to the skin and hair of some of the animals by means of an adhesive. In others, an attempt was made to secure implants in situ by tying a knot in the free ends of the cords. One of the cows whose implant was secured by a knot lost its implant and was withdrawn from the study. The implants were removed from the other 9 on the 16th day. All came into estrus 1 or 2 days after withdrawal of the implant, and were artificially inseminated. Six of the nine cows conceived to this first post-treatment insemination.

EXAMPLE 16

Sixty-seven Hereford cows which had calved between 114 and 25 days previously were randomly divided into a control lot of 22 animals and 3 test lots of 15 animals each. The animals in the first test lot were placed on daily feed containing the equivalent of 10 mg. 6 - dehydro - 6- chloro - 16 - methylene - 17α - acetoxyprogesterone per animal per day for 18 days. The cows in the second test group were implanted subcutaneously in the neck with an implant as described in the previous examples containing 200 mg. of norethandrolone and the implant was allowed to remain in place for 16 days. The cows in the third test group were placed on a daily ration containing the equivalent of 1 mg. of 17α - acetoxy - 6-methyl-16-methylenepregna - 4,6-diene-3,20-dione per animal per day for 14 days. The control cows were placed on the same basal ration as the cows in the test groups. As each cow in any group was detected in estrus, she was artificially inseminated. One of the cows in the second group lost its implant.

Of the 15 cows treated with 6 - dehydro - 6 - chloro-16-methylene - 17α - acetoxyprogesterone, 11 had come into estrus by 35 days after termination of treatment, the date of first estrus being 7, 8, 9, 9, 14, 19, 25, 26, 28, 30 and 35 days after termination of treatment. On the 14 cows retaining their norethandrolone implants, 13 came into estrus within 2 days of removal of the implant. Of the 15 animals receiving 17α - acetoxy - 6 - methyl-16-methylenepregna - 4,6 - diene - 3,20 - dione, 11 had come into estrus by 35 days subsequent to termination of the treatment, 8 of these five or six days subsequent to termination of treatment and the remaining 3 more than 22 days subsequent to the termination of treatment. 19 of the 22 control animals came into estrus at various times during the approximate 3 month period in which the other animals were treated and observed.

Insemination of all cows approximately 12 hours after first detected in estrus resulted in 11 of 22 controls, six of 14 treated with norethandrolone, three of 15 treated with 6 - dehydro - 6 - chloro - 16 - methylene-17α-acetoxyprogesterone and two of 15 treated with 17α-acetoxy-6-methyl - 16 - methylenepregna - 4,6 - diene-3,20-dione conceiving.

What is claimed is:

1. A composition for controlling ovulation and estrus in bovines comprising 17α - ethyl - 19 - nortestosterone dispersed in a copolymer of a major amount of a monoester of an acrylic or methacrylic acid and a minor amount of a diester of one of said acids, each monomer component being chosen such that the resultant copolymer contains at least one free hydroxy group.

2. The composition of Claim 1 wherein the monoester is 2 - hydroxyethylmethacrylate and the diester is ethylene glycoldimethacrylate.

3. The composition of Claim 1 wherein the composition is a cylindrical rod.

4. The composition of Claim 1 wherein the composition is a cylindrical tube.

5. The composition of Claim 1 wherein the amount of 17α-ethyl-19-nortestosterone dispersed in the copolymer is about 100 to 300 mg.

6. The composition of Claim 1 wherein the copolymer is formed by polymerization of the monomers in the presence of a catalytic quantity of a polymerization initiator but in the absence of an aqueous solution.

7. The composition of Claim 6, wherein the initiator is diisopropyl peroxydicarbonate.

8. A cylindrically shaped, removable subcutaneous implant composition for controlling ovulation and estrus in bovines comprising a low implant dosage amount of 17α-ethyl-19-nortestosterone effective to control ovulation and estrus in bovines and permit the near simultaneous release of estrus and ovulation within an optionally short pre-determinable period after discontinuance of its use without impairment of fertility, particularly on the first treatment cycle, said effective low implant dose being effective orally to prevent ovulation and estrus in cows, dispersed in a copolymer of a major amount of a monoester of an acrylic or methacrylic acid and a minor amount of a diester of one of said acids, each monomer component being chosen such that the resultant copolymer contains at least one free hydroxy group.

9. A cylindrical rod suitable for in vivo implantation in animal husbandry to provide prolonged release of norethandralone comprising 100 mg. of norethandralone homogeneously dispersed in a copolymer of a major amount of 2-hydroxyethyl methacrylate and a minor amount of ethylene glycol dimethacrylate, wherein said copolymer is molded in the form of a cylinder by in situ mold polymerization of an anhydrous solution of said monomers with said norethandralone dissolved therein, in the presence of a catalytic quantity of a polymerization initiator.

References Cited

UNITED STATES PATENTS

| | | | |
|---|---|---|---|
| 2,625,158 | 1/1953 | Lee et al. | 128—260 |
| 2,976,576 | 3/1961 | Wichterle et al. | 18—58 |
| 3,220,960 | 11/1965 | Wichterle et al. | 260—2.5 |
| 3,499,445 | 3/1970 | Reed | 128—260 |
| 3,520,949 | 7/1970 | Shepherd et al. | 260—857 |

FOREIGN PATENTS 701,813   9/1967   Belgium.

OTHER REFERENCES

Chem. Abstracts, 53, 566e (1959), Richter, The Effect of 17α-Ethyl-19-Nortestosterone on the Estros Cycle.

SHEP K. ROSE, Primary Examiner

U.S. Cl. X.R.

424—81; 128—260

Disclaimer

3,830,907.—*George E. Short*, Arlington Heights, Ill. COMPOSITIONS FOR THE SUSTAINED RELEASE OF 17a-ETHYL-19-NORTESTOSTERONE. Patent dated Aug. 20, 1974. Disclaimer filed Nov. 24, 1974, by the assignee, *G. D. Searle & Co.*

Hereby enters this disclaimer to claim 8 of said patent.

[*Official Gazette July 1, 1975.*]